United States Patent Office 3,072,691
Patented Jan. 8, 1963

---

3,072,691
CYCLOPENTADIENYL METAL OXYHALIDES
Richard D. Gorsich, Baton Rouge, La., assignor to Ethyl Corporation, New York, N.Y., a corporation of Delaware
No Drawing. Filed May 20, 1959, Ser. No. 814,388
9 Claims. (Cl. 260—429.5)

This invention relates generally to organo metal compounds and more particularly to cyclopentadienyl metal oxyhalide compounds of metals of group IV–B.

Up until very recently no stable organic metal compounds of the above metals had been known. A few cyclopentadienyl derivatives of these transition metals have recently been reported, such as, for example, cyclopentadienyl titanium monohalides (British Patent No. 768,083) and bis(cyclopentadienyl) titanium dihalides (British Patent No. 785,760).

Compounds of the above metals are believed to have a "sandwich-type" bond between the cyclopentadienyl group and the metal atom, i.e., the group being bonded to the metal atom through all of its 5-ring carbon atoms. In these compounds, the cyclopentadienyl group donates electrons to the metal such that the metal atom attains or approaches the electron configuration corresponding to that of the next higher rare gas, i.e., krypton in the case of titanium, for example.

It is accordingly an object of this invention to provide new and novel compounds of metals of group IV–B, and a process for their manufacture. Another object is to provide compounds of the above type which are both thermally and oxidatively stable. In addition, it is an object to provide compounds of this type having relatively good hydrolytic stability. Another object is to provide compounds of the above metals which have relatively good solubility in organic solvents and are useful in many applications, particularly as polymerization catalysts and as fuel additives, e.g., as antiknocks for gasoline for use in internal combustion engines. Other objects of the invention will become more apparent from the following description and appended claims.

It has now been found that these and other objects are accomplished by the provision of cyclopentadienyl metal halide compounds of metals of group IV–B, the compounds containing either 1 or 2 halogens and an oxygen atom. More particularly, the compounds of this invention correspond to the general formula:

$$(RMX_x)_yO_z$$

wherein R is a cyclopentadienyl moiety containing a 5-carbon atom ring similar to that found in cyclopentadiene itself, M is a group IV–B metal. X is a halogen including fluorine, chlorine, bromine and iodine, $x$ is an integer of 1 to 2, $y$ is an integer of 2 to 4 and $z$ is an integer of 1 to 4. Astatine would also be expected to be suitable since it is a halogen but is presently believed impractical due to its instability.

The cyclopentadienyl oxymetal halides of this invention are exceptionally thermally stable and are also unaffected at normal temperatures by both air and oxygen. In addition, these compounds are relatively insensitive to water, particularly in a solid or crystalline state. These compounds have many uses including utility as polymerization catalysts and antiknocks. For this use, the relatively high thermal and oxidative stability make the compounds particularly suitable for convenient use as a blend in gasoline.

The compounds of this invention can be prepared by reacting a monocyclopentadienyl metal trihalide or ester, e.g., $C_5H_5TiCl_2OR'$ where R' is alkyl or aryl with water in appropriate solvents. For example,  $(C_5H_5TiCl_2)_2O$ can be prepared by reacting cyclopentadienyl titanium trichloride with water in tetrahydrofuran utilizing a 1:1 molar ratio of reactants. By using a 2:1 ratio or greater of water to cyclopentadienyl titanium trichloride, the product is $(C_5H_5TiClO)_4$. This reaction can be carried out with or without a catalyst at a temperature of $-20$ to $250°$ C., preferably at a temperature of 0 to $150°$ C. Generally the reaction is conducted in an inert atmosphere, especially for the preparation of compounds having the general formula $(RMX_2)_2O$, as defined above. In general, the preferred solvents for this invention are ethers, including aliphatic, aromatic and polyethers including tetrahydrofuran, ethylene glycol dialkyl ethers, diethylene glycol dialkyl ethers and higher glycol ethers such as tri- and tetraethylene glycol diethylene ethers, and ketones such as acetone. Other solvents suitable are aliphatic, cycloaliphatic or aromatic hydrocarbons, aliphatic, cycloaliphatic and aromatic, chlorinated hydrocarbons.

The above physical properties, such as thermal stability and high solubility, of the compounds of this invention are very unusual and unexpected. Based upon the well-known theories of N.V. Sidgwick ("The Chemical Elements and Their Compounds," Clarendon Press, Oxford, 1950), these compounds would not be expected to be stable. Considering titanium for example, the known bis-(cyclopentadienyl) titanium dichloride approaches the most stable configuration by the above theory. According to the Sidgwick theory, titanium needs 14 donated electrons to have an electron configuration similar to krypton, and in the above compound, 12 electrons are donated, theoretically. This is contrasted with the compounds of the present invention, e.g., $(C_5H_5TiCl_2)_2O$ wherein apparently only 8 electrons are donated. Thus, the compounds of this invention would not be predicted to exist, let alone have the relatively great stability actually exemplified by the present compounds, especially those of the type $(RMXO)_4$. Likewise, compounds of the type $(RMX_2)_2O$ having a single M—O—M bond previously have not been prepared.

Solubility in organic media is also greatly affected by the relative degree of donation of electrons in metallic compounds of this type. That is, in general, as the metal of the compounds approach or attain "rare gas structure," the solubility of the compound usually increases materially, at least in non-polar solvents. Moreover, the additional cyclopentadienyl group as for example in bis(cyclopentadienyl) titanium dichloride would be expected to give the compound much greater solubility in organic solvents due both to the presence of additional hydrocarbon moieties and to the expected increased stability of the titanium atom due to additional electron donation. Thus, the improved solubility in organic solvents to the compounds of this invention over known compounds is completely unexpected.

Typical examples of compounds which can be made in accordance with this invention are compounds of the type $(RMX_2)_2O$ and $(RMXO)_4$. Specific examples of such compounds are bis(cyclopentadienyltitanium dichloride) oxide and tetrakis(cyclopentadienyltitanium chloride) tetroxide, both derived from cyclopentadienyltitanium trichloride and esters, e.g., cyclopentadienylalkoxytitanium dichloride. Other compounds of this invention are corresponding oxides of cyclopentadienyl titanium trifluoride, cyclopentadienyl titanium tribromide, cyclopentadienyl titanium triiodide, cyclopentadienyl titanium triastatide, and corresponding metal halide compounds containing ethylcyclopentadienyl, butylcyclopentadienyl, octylcyclopentadienyl, dimethylcyclopentadienyl, dihexylcyclopentadienyl, vinylcyclopentadienyl, ethynylcyclopentadienyl, phenylcyclopentadienyl, methylphenylcyclopentadienyl, acetylcyclopentadienyl, allylcyclopentadienyl, benzylcyclopentadienyl, tolylcyclopentadienyl and other like radicals. Esters which can be employed include cyclopentadienyl(methoxy) titanium dichloride, cyclopentadienyl(phenoxy)zirconium dibromide, methylcyclopentadienyl(propoxy)hafnium difluoride, vinylcyclopentadienyl(dodecyloxy)titanium diiodide.

Other cyclopentadienyl metal halide compounds which can be used to prepare compounds of this invention are cyclopentadienylzirconium trichloride, methylcyclopentadienylzirconium tribromide, cyclopentadienylhafnium trichloride and phenylcyclopentadienyl hafniumtrifluoride.

In the preferred compounds of the present invention, the cyclopentadienyl moiety contains from 5 to 15 carbon atoms and includes not only alkyl and aryl substituted cyclopentadienyl groups, but also includes indenyl and fluorenyl derivatives including substituted indenyl and fluorenyl derivatives.

As pointed out above, the compounds of this invention can be prepared by reacting a cyclopentadienyl metal trihalide of metals including titanium, zirconium and hafnium with varying amounts of water in appropriate solvents. The cyclopentadienyl metal trihalides can be prepared by known techniques such as that disclosed in J. Am. Chem. Soc. 80, 4744 (1958).

The present reaction can be conducted at temperatures of 0° to 250° C., preferably in an organic solvent in which both water and the trihalide compound or ester may be dissolved. The solvents particularly suitable for this invention are ethers including aliphatic, aromatic and cyclic ethers, as well as polyethers, such as ethylene glycol, diethylene glycol and triethylene glycol ethers and ketones such as acetone. In addition, certain amines and acetals are also suitable solvents; also suitable are aliphatic, cycloaliphatic and aromatic hydrocarbons, chlorinated hydrocarbons.

Typical examples of suitable solvents for the present invention are hexane, decane, cyclohexane, benzene, toluene, xylene, mesitylene, ethyl benzene, diethyl benzene, trichlorobenzene, chloroform, carbon tetrachloride, tetrahydrofuran, dimethyl ether, diethyl ether, dibutyl ether, methyl ethyl ether, ethylene glycol dimethyl ether, ethylene glycol, diethyl ether, diethylene glycol dimethyl ether, diethylene glycol diethyl ether, diethylene glycol dibutyl ether, diethylene glycol methyl ethyl ether, triethylene glycol dimethyl ether, tetraethylene glycol dimethyl ether, dicyclohexylamine and methylal.

In preparing the compounds of this invention, the cyclopentadienyl metal trihalide (or esters) are reacted with water in a molar ratio of from about 1:10 to about 20:1. When using the ratios above about 1:1 (water:cyclopentadienyl metal halide or ester) the tetramer, i.e. $(RMXO)_4$ is predominantly formed whereas with ratios below about 1:1 compounds of the type $(RMX_2)_2O$ are the principal product. In general, if tetramer is desired ratios of 1:1 to 5:1 (water to cyclopentadienyl metal halide) is preferred. When the bis-compound is desired, best results are obtained with ratios of 1:2 to 1:1. The particular ratio depends somewhat on the solvent concentration. With dilute solutions (more solvent) the tendency is to produce the dimeric form.

The quantity of solvent can range from about molar equivalents or below to several equivalents, e.g., about 100 moles of solvent per mole of reactants. More dilute concentrations are preferable for the preparation of compounds of the type $(RMX_2)_2O$. More concentrated solutions can also be used where the product is of the type $(RMXO)_4$.

The following examples illustrate the preparation of compounds of this invention. In these examples, all parts are given in parts by weight.

*Example I*

A reaction vessel equipped with a magnetic stirrer, addition funnel and nitrogen inlet tube was purged with dry nitrogen and was thereafter charged with 5 parts of cyclopentadienyltitanium trichloride and 175 parts of tetrahydrofuran freshly distilled from lithium aluminum hydride. The addition funnel was charged with 0.41 part of water and 35 parts of tetrahydrofuran. This was added dropwise during a period of 2 hours to the stired cyclopentadienyltitanium trichloride solution while blanketing the reaction mixture with nitrogen. The yellow mixture was light orange after the addition was complete. The tetrahydrofuran was distilled off under nitrogen until the volume was about 60 parts. Subsequently, 200 parts of n-hexane was added and the mixture was distilled to about one-half volume. After allowing the mixture to stand at room temperature overnight, the yellow granular material was rapidly filtered off and dried in vacuo to give 4 parts of $(C_5H_5TiCl_2)_2O$ melting between 145–150° C. Recrystallization of the product from carbon tetrachloride gave 3.13 parts of pure $(C_5H_5TiCl_2)_2O$ melting at 149–151° C.

*Analysis.*—Calcd. for $C_{10}H_{10}OCl_4Ti_2$: C, 31.29; H, 2.63; Ti, 24.96; mol. wt., 383. Found: C, 31.33; H, 2.73; Ti, 24.6; mol. wt., 368.

The cyclopentadienyl titanium dichloride oxide produced as above is an effective catalyst for polymerization of olefins. As an example of this utility, 50 parts of the bis(cyclopentadienyl titaniumdichloride) oxide prepared as above is mixed with equal mole quantities of aluminum triethyl in hexane solvents (250 parts) and gaseous ethylene at 300 pounds per square inch is fed to the reactor, while continuously stirring the reaction mixture after the ethylene consumption has essentially ceased. The reaction mixture is then washed with alcoholic HCl to precipitate a white solid polyethylene polymer. Excellent yields of polymer are obtained by employing the titanium compounds of this invention.

*Example II*

Four parts of cyclopentadienyltitanium trichloride were dissolved in about 80 parts of acetone. Water was added dropwise to the refluxing solution until crystals began to deposit. The mixture was then allowed to cool and stand at room temperature overnight. The yellow needles were filtered off and dried in vacuo to yield 3 parts of

$(C_5H_5TiClO)_4$ melting at 258° C. with decomposition.

*Analysis.*—Calcd. for $(C_5H_5TiClO)_4$: C, 36.52; H, 3.07; Cl, 21.57; Ti, 29.13. Found: C, 36.63; H, 3.14; Cl, 20.98; Ti, 29.06.

*Example III*

Two parts of cyclopentadienyltitanium trichloride were dissolved in 20 parts of methanol. The excess methanol was stripped off in vacuo to leave $C_5H_5TiCl_2(OCH_3)$ which was dissolved in about 40 parts of acetone. To this refluxing solution was added water in a dropwise fashion until crystals began to form. The mixture was cooled to room temperature and finally by an ice-bath. The yellow crystals were filtered off and dried to give 1.25 parts of $(C_5H_5TiClO)_4$ melting at 259° C. with decomposition.

*Example IV*

Example I is repeated except that bis(methylcyclopentadienyltitanium tribromide) is employed with 200 parts of diethylene glycol dimethyl ether. The reaction is conducted at 150° C. When a molar ratio of 1:2 of water to the titanium compound is employed, a good yield of bis(methylcyclopentadienyltitanium dibromide)oxide is obtained.

*Example V*

Octylcyclopentadienyl zirconium trifluoride is reacted with water [4(water) to 1 molar ratio] in accordance with the procedure of Example II, a good yield of tetrakis(octylcyclopentadienyl zirconium fluoride)tetroxide is obtained.

*Example VI*

Example I is repeated except that vinylcyclopentadienyl hafnium triiodide is reacted with water in trichlorobenzene solvent at 0° C. Using a 1:1 water ratio the product bis(vinylcyclopentadienyl hafnium diiodide)oxide is obtained in good yield.

*Example VII*

Example I is repeated except that fluorenyltitanium triiodide is employed. Similar results are obtained.

I claim:
1. Compounds of the general formula:

(RMXO)₄ wherein R is a cyclopentadienyl hydrocarbon group containing from 5 to 15 carbon atoms, M is a group IV–B metal, and X is a halogen.
2. The compounds of claim 1 wherein M is titanium.
3. The compounds of claim 1 wherein M is titanium and X is chlorine.
4. Tetrakis(cyclopentadienyl titanium chloride) tetroxide.
5. A process of preparing cyclopentadienyl metal halide oxides of group IV–B metals characterized by reacting water with a monocyclopentadienyl metal dihalide ester having the formula

RMX₂OR′ wherein R is a cyclopentadienyl hydrocarbon group containing from 5 to 15 carbon atoms, M is a group IV–B metal, X is a halogen and R′ is selected from the group consisting of alkyl and aryl radicals containing up to 12 carbon atoms; the reaction being effected in an inert organic solvent, in an inert atmosphere using a molar ratio (metal compound:water) of from about 1:10 to about 20:1, and at a temperature of from about 0° C. to about 150° C.
6. The process of claim 5 wherein M is titanium.
7. The process of claim 5 wherein X is chlorine.
8. The process of claim 5 wherein R′ is a methyl group.
9. The process of claim 5 wherein said monocyclopentadienyl metal dihalide ester is monocyclopentadienyl titanium dichloromethoxide.

References Cited in the file of this patent
UNITED STATES PATENTS

| | | |
|---|---|---|
| 2,864,843 | De Witt et al. | Dec. 16, 1958 |
| 2,917,501 | Drucker et al. | Dec. 15, 1959 |
| 2,922,803 | Kaufman | Jan. 26, 1960 |
| 2,983,740 | Thomas et al. | May 9, 1961 |

OTHER REFERENCES

Fischer et al.: Chemesiche Berichte No. 6 (1958), pp. 1342–1344.

Notice of Adverse Decision in Interference

In Interference No. 93,873 involving Patent No. 3,072,691, R. D. Gorsich, CYCLOPENTADIENYL METAL OXYHALIDES, final judgment adverse to the patentee was rendered Apr. 7, 1966, as to claim 4.

[*Official Gazette June 28, 1966.*]